United States Patent

Lindsay, Jr.

[11] Patent Number: 5,926,908
[45] Date of Patent: Jul. 27, 1999

[54] ACOUSTIC COMMUNICATOR FOR CENTRAL VACUUM CLEANERS

[75] Inventor: Edward W. Lindsay, Jr., New York, N.Y.

[73] Assignee: Lindsay Manufacturing, Inc., Ponca City, Okla.

[21] Appl. No.: 08/851,598

[22] Filed: May 5, 1997

Related U.S. Application Data

[63] Continuation-in-part of application No. 08/478,952, Jun. 7, 1995, abandoned.

[51] Int. Cl.$^6$ .................................................. A47L 5/38
[52] U.S. Cl. ................................................ 15/319; 15/314
[58] Field of Search ........................... 15/301, 314, 319; 181/296; 406/15

[56] References Cited

U.S. PATENT DOCUMENTS

| | | | |
|---|---|---|---|
| 4,829,626 | 5/1989 | Harkonen et al. | 15/314 |
| 4,991,253 | 2/1991 | Rechsteiner | 15/301 |
| 5,191,673 | 3/1993 | Damizet | 15/314 |
| 5,274,878 | 1/1994 | Radabaugh et al. | 15/314 |
| 5,343,590 | 9/1994 | Radabaugh | 15/319 |

FOREIGN PATENT DOCUMENTS

94/23633  10/1994  WIPO ...................................... 15/319

Primary Examiner—Chris K. Moore
Attorney, Agent, or Firm—Bruce Day

[57] ABSTRACT

A wireless acoustic communicator is disclosed which permits a remotely-located operator to monitor and control a central vacuum cleaner. The acoustic communicator does not need problematic batteries, airflow blockers, or special wiring networks but uses only low-frequency acoustic signals that are transmitted through the pipe system of the vacuum cleaner. Command signals are effectively transmitted, even while air is flowing through the pipe system, by using a continuous multi-frequency signal, a resonant physical structure, and an adaptive signal detector. A preferred embodiment uses a powerful reed to generate a continuous acoustic signal. The reed is manually plucked by a slide switch to start vibration, which is then continued by the airflow through the pipe system caused by the running vacuum motor. The vacuum motor runs only if the signal is present. The acoustic communicator includes a resonant detection tube that filters the signal before it reaches a microphone. The adaptive signal detector reacts to noise and airflow sensed with a microphone by tracking signal phase, altering detection criteria, and sampling independently in time, frequency, and space. In addition, the wave form of the acoustic signal can be changed to create a control signal for other central vacuum cleaner functions, such as motor speed control. The acoustic communicator can also be used to monitor the central vacuum cleaner; for example, it can report a full condition of the dust filter.

13 Claims, 4 Drawing Sheets

ACOUSTIC COMMUNICATOR FOR CENTRAL VACUUM CLEANERS

This is a continuation in part of application Ser. No. 08/478,952, filed Jun. 7, 1995, abandoned.

I. FIELD OF THE INVENTION

The present invention is directed to wireless communication for a central vacuum cleaner comprising a central machinery and a pipe system connecting the central machinery to remote working points. More particularly, the present invention is directed to low-frequency acoustic communication between the central machinery and the remote working points using the pipe system as the transmission channel, with such communication being used to control and monitor the operation of the central machinery from the working point.

II. DESCRIPTION OF THE RELATED ART

Central vacuum cleaners are popular in a variety of buildings, notably family homes. A typical central vacuum cleaner consists of a central machinery and a pipe system that connects the machinery to remote work points in the home. The machinery is usually centrally located in the garage or basement of the home and is typically comprised of a vacuum pump driven by an electric motor, control circuitry, and a plenum for collecting debris. The pipe system typically includes fixed rigid tubing, inlet valves, flexible tubing (hose), moveable rigid tubing (wands), and a cleaning nozzle. Usually, there is a handle held by the operator that connects the hose to the wands. The actual working point, where debris is vacuumed up, may be at the inlet valve or at the end of the hose, wands, or nozzle.

Because the working point can be and usually is remote from the central machinery, central vacuum cleaners involve a communication difficulty not experienced by portable vacuum cleaners; namely, the difficulty of enabling the operator at the working point to control and to monitor the central machinery. Prior art attempts to solve this communication problem have been essentially limited to the vital control function of turning the central machinery on and off; proposals have been made for controlling the speed of the motor, but none have become commercially available.

Prior art attempts to remotely turn the central machinery on and off can be divided into three categories: 1) electrical current relay using dedicated low-voltage wiring; 2) radio-frequency radiation using free space or house wiring as the primary transmission channel; and 3) pneumatic changes in pressure or airflow using a pipe system as the transmission channel.

The current relay is the oldest attempt and the one used in nearly all central vacuum cleaners. This system involves mounting an electrical switch in a wall inlet valve or in the handle of the hose. If the switch is mounted in the handle then it is connected to the inlet valve by winding two wires along the hose to contact points on the end of the hose; when the hose is inserted into the inlet valve, the contact points on the hose touch matching contact points in the inlet valve. The contact points or switch in the inlet valve are connected to a wire pair that runs along the fixed tubing to an electrical relay which switches the electrical motor on and off.

This attempt suffers from three serious disadvantages: First, it is inordinately expensive to install a wire pair running the length of the hose and tubing, particularly where electrical codes require that the wires be placed inside a separate conduit. Second, these wires are prone to breakage, creating an electrical open or a short circuit that is difficult to locate and expensive to repair. Third, the contact points frequently wear out or break, preventing the operator from activating the central machinery. In addition, safety experts have speculated that this method might not be fail-safe in the event of a fire in the home: the fire could melt the pipe and wires causing a short circuit that falsely activates the cleaner, thereby drawing air into the pipe system and possibly spreading the fire, particularly if the central machinery has a plastic housing.

Attempts employing radio frequencies have proven to be far less reliable and much more expensive than the current relay. These systems require licensing approval and are restricted to such low power that the vacuum motor is erroneously turned off and blockage and interference frequently occur. Of particular concern is the delicate electronic circuitry including a battery, which is mounted in the handle and thereby subjected to constant vibration and strong shocks when the handle is dropped. In addition, these attempts are not fail-safe since a momentary signal must be transmitted and received in order to stop the central machinery; inability to stop the machinery may be dangerous and disturbing to the remotely located operator.

Attempts employing pneumatics, such as that disclosed in U.S. Pat. No. 4,225,272, issued to Palmovist in September of 1980, also have proven to be more expensive than the current relay and far less convenient for the operator. In order to be as reliable as the current relay, pneumatic control systems must move enough air to create a sizeable change in air pressure, otherwise the system may be deceived by leaks, by natural fluctuations in atmospheric pressure or by the chimney effect in tall buildings. Pneumatic control systems also lose sensitivity over time and malfunction. Such a necessary sizeable change in air pressure can take several seconds, which combined with a motor response time of several seconds can be aggravating to the operator, in contrast to the lesser time delay of the current relay. Also compared to the current relay, considerably more effort by the operator is required to create a pneumatic pressure differential, such as by opening the inlet value, removing the hose, operating a pipe blocking mechanism or operating a manual pump. In addition, continually powering an electrical secondary pump or using a manual pump for starting to create a pressure differential is uneconomical or inconvenient. Pneumatic control systems are also subject to air leaks, which cause them to malfunction.

An alternative approach using pneumatics for stopping only is disclosed in our commonly used U.S. Pat. No. 4,829,626, issued to Harkonen et al. on May 16, 1989. This method uses acoustics for starting the vacuum motor by providing an acoustic-signal generator in the wand handle. When activated, the generator transmits a sound signal through the pipe system to a sensor in the control circuitry of the central machinery, which in response starts the motor of the vacuum cleaner. A single-frequency sound signal is generated only momentarily to start the motor. If the motor has started as intended, it keeps running until pneumatically signaled to stop by blocking airflow. Airflow is blocked by a flap usually located in the handle, which is manually swung into position by the operator. Then an airflow sensor detects the stoppage of airflow, and, in response, sends a signal to stop the motor.

The use of acoustics for starting is preferred to pneumatics because only about one-millionth the energy is required for signaling enabling the equipment to be smaller with a lesser effort required by the operator. The acoustic transmission rate is about 100 times faster and the operator should not notice any significant delay. However, Harkonen teaches that acoustics cannot be used when the vacuum cleaner is being operated because of noise and transmission problems. Consequently, Harkonen employs pneumatic signaling for stopping.

Perhaps the greatest difficulty with the pneumatic methods lies in the means for stopping the vacuum cleaner. In the normal course of using a vacuum cleaner, many possibly events could block the flow of air through the hose. For example, merely pressing the cleaning nozzle hard against a surface can block the flow of air sufficiently to cause the motor to stop. This is particularly the case when a small nozzle is used on non-porous materials or in crevices. Furthermore, objects too large to pass rapidly through the tubing may be picked up and may cause the motor to be turned off by mistake, resulting in a problematic blockage that otherwise would not have occurred. Most importantly, using the stoppage of airflow as a stop signal is not a fail-safe technique. If there is an air leak in the pipe system, if the blocking mechanism is obstructed by debris from closing completely, or if the pneumatic sensor is not kept properly calibrated or lubricated in the dusty environment, then the machinery could fail to stop. Also, the blocking mechanism can be cumbersome to operate, particularly if dirt accumulates inside, and it cannot match the "fingertip" convenience of the electrical switch of the current relay.

Additionally, Harkonen mentions that a second acoustic signal of a different frequency could be used in place of the normal start signal in order to command the use of a different motor speed. However this technique of speed control would be unsatisfactory in practice because if a change of speed is desired while vacuuming, the operator must first signal the central machinery to stop by using the flap to block airflow, then wait for the motor to stop and wait an additional lock-out period during which the control circuitry will prevent restart, and then restart the machinery by transmitting the second signal.

Regarding other uses for communication in central vacuum cleaners, prior art of portable vacuum cleaners suggest that monitoring functions are desirable. Such functions include alerting the operator that the dirt filter or bag is full or ruptured, that the cleaner is not operating properly or needs a service check, and that the cleaner is picking up a preset level of debris. These functions should be more important for central vacuum cleaners because of the remote location of the operator.

Consequently, there is a need for wireless communication to control and monitor the central machinery from the working point, with such communication being fail-safe, avoiding the blockage of airflow, and functioning even when the central machinery is activated and air is flowing in the pipe system of the central vacuum cleaner.

III. OBJECTS AND SUMMARY OF THE INVENTION

Accordingly, it is the primary object of the present invention to provide a new method of control for a central vacuum cleaner which enables a remotely-located operator to start and stop the cleaner in a fail-safe manner; another object is to provide such a method which is more economical than previous methods yet is at least as convenient for the operator and without problematic batteries, airflow blockers, or special wiring networks.

A more general object of the present invention is to provide a reliable communication method by which the operator can both control and monitor the central vacuum cleaner even when air is flowing through the pipe system. Besides starting and stopping, control functions include power boost, speed control, monitor control, and automatic vacuum regulation. Monitor functions include alerting the operator that the dirt filter or receptacle is full or ruptured, that excessive moisture or water is being picked up, that the central machinery requires a maintenance check, and that the amount of dirt being picked up is above or below a preset level.

To these ends, the invention provides a totally acoustic bidirectional method of communication using the air in the pipe system of the cleaner as the transmission channel and using as an acoustic source at the working point an air-powered reed controlled by a convenient slide switch. Such communication is made possible by use of a resonant physical structure, a continuous multifrequency signal and an adaptive signal detector.

The resonant physical structure, called a detection tube, is a special side branch added to the pipe system near the central machinery. The acoustic transducer is placed at the end of this detection tube, which is at least several pipe diameters long and is a dead end with no airflow. Consequently, the transducer is largely protected from pseudosound, which consists of non-acoustic pressure variations including vortices produced by turbulent airflow.

In the present invention, the detection tube is also designed to be a quarter-wavelength standpipe resonator which functions as a mechanical band-pass filter for the acoustic control signal with little extra cost. By substantially reducing the noise reaching the transducer, the detection tube makes it more likely that a commonly available and economical microphone can be used as the transducer. Also, the transducer can be largely protected from debris by mounting the tube vertically with the transducer end up. The tube itself can be assembled very economically out of parts already used in building the pipe system. For longer wavelengths that would require an inconveniently long tube, a Helmholtz resonator could be used, or baffles could be placed inside the tube to effectively lengthen the tube by folding or spiraling the pathway that the signal must traverse. In order to increase the filtering selectivity of the tube, sections with larger and/or smaller diameters than the tube itself could also be installed in the tube.

Alternatively, the pseudosound can be discriminated against on the basis of propagation speed by using two transducers placed a distance, D, apart on the main branch of the pipe system, where D is perhaps one meter and at least several pipe diameters to ensure sampling independence. The signal from the transducer further away from the central machinery is electrically delayed by a time, T, which is equal to the time required for an acoustic signal to travel the distance, D, between the two transducers; so T=C/D, where C is the speed of sound, neglecting the speed of air flowing in the pipe. Then the delayed signal is electrically added to the current signal from the second transducer; therefore, that portion of the signal that is due to sound propagating towards the central machinery will be doubled, but the rest of the signal will add randomly, including the non-periodic pseudosound, and should be reduced when averaged over time. The signal delay and adding can also be accomplished physically and with a single transducer by using a parallel pathway in place of the first transducer, with the pathway designed to have comparatively little airflow and to conduct the signal to the remaining transducer where the signal will combine in the air with the signal received directly from the pipe system.

Additional combining of the two transducer signals can be used to further discriminate in favor of the signal of interest, and more transducers could be employed for greater selectivity. In particular, if D is chosen to be equal to one-quarter of the wavelength of the signal interest, then acoustic noise of the same wavelength propagating from the central machinery, which can be quite noisy, will be canceled out when the signals from the two transducers are added. Furthermore, this arrangement can be used to estimate the speed of airflow in the pipe system, typically less than 20 meters per second, without the need for a special pneumatic airflow or pressure sensor than can have reliability problems. By separately adding the two signals with various time delays corresponding to speeds of under 20 meters per second, the delay that results in the best correlation can be selected, which should correspond to the speed of propagation of the vortices and thus indicate the airflow speed; if a threshold speed is of interest, then the time delay corresponding to that speed can be used and the magnitude of the sum of the signals used to indicate when the threshold speed is attained. The speed of airflow can be used to aid reliable detection of an acoustic control signal by adapting the criteria for declaring detection based on airflow and noise level.

That portion of acoustic noise that is due to rubbish moving through the pipe system is much more intense above 600 hertz, so the preferred embodiment avoids this problem by using a signal frequency below 600 hertz. However, there are other substantial sources of low frequency noise, namely noise from outside the pipe system and noise generated by the pipe system itself. This pipe system noise is generated by resonating structures such as side branches and especially the hose and also by movement of the hose and wands during the cleaning process. Still, it is possible to generate an acoustic control signal that is substantially greater than the background noise of the same frequency, particularly if the frequency of the control system is chosen to avoid probable frequencies for pipe system noise.

The present invention satisfies the objective of being fail-safe by using a new control logic requiring a continuous run signal for activation of the cleaner, rather than momentary start and stop signals. Therefore, if anything inhibits the signal, the cleaner will stop, failing safely. Also, if there is a false signal that starts the cleaner, it will stop almost immediately because the continuous signal will not be present.

The use of a continuous control signal comprised of a periodically repeated waveform is also advantageous for detection, especially when a substantial amount of noise is present. Because the signal is continuously repeated, its phase and exact waveform, as modified during transmission through the pipe system, can be determined during the start up of the cleaner and during other low noise times. This information can be used to more easily detect the signal during periods of high noise by making it possible to reject most of the noise that has the same frequency as the control signal but that differs in phase. The signal can be more reliably detected during periods of high noise by using a waveform that contains two or more major frequency components; then if the noise is too great at one frequency, the other frequencies can be checked, provided that they are sufficiently different from the first frequency so that their noise changes independently of the noise of the first frequency.

The waveform of the acoustic control signal should be selected to avoid the high-noise regions of the acoustic spectrum. The primary frequency should be below 300 hertz for good transmission in the pipe system and to avoid most rubbish noise, and it should be above 20 hertz to avoid airflow noise due to turbulence and in particular to avoid the infrasound produced by the hose. For example, a waveform could be selected with frequency components of 50, 100, and 200 hertz.

The use of very low frequencies enables the acoustic signal to pass through a blockage in the pipe system, in effect, so that the cleaner can still be controlled, as long as the blockage is not rigid and airtight or longer than the wavelength of the signal. For example, the hose can be stepped on and kinked, shutting off nearly all the airflow and yet the control signal will still pass through. In the event of a blockage, it is important that the cleaner not be shut off because the blockage may be slowly moving or disintegrating and will clear by itself if the cleaner continues to run. However, even very low frequency signals can have a problem with certain components of central vacuum cleaners, including gate valves and intercepter canisters. The present invention proposes to bypass these components with tubing that contains a flexible diaphragm which blocks airflow but transmits very low frequency sound; the diaphragm can also be built directly into the component.

The most powerful algorithm for detection of a multifrequency control signal is to convolve a predicted control signal with the output of the transducer. The control-signal prediction is made on the basis of the known phase and waveform as received at earlier times. This signal is multiplied by the output signal and the resulting product is integrated over a fixed time period; for better discrimination against noise, the time period should be longer, but it should be smaller than the response time desired by the operator, say two seconds.

If no control signal is present in the output signal, then the integral will contain only the product of the predicted signal and random noise, which will average out to zero over time. If the control signal is present, then the integral additionally will contain the square of the control signal, approximately, which will always be non-negative and will average out to a positive value over time. Subsequently, the value of the convolution integral can be compared to a detection criterion level, with detection being declared and thus the machinery remaining activated if the level is exceeded.

The convolution requires an accurate prediction of the phase of the control signal. However, the phase will change slowly over time due to changes in airflow or in the vibrating reed. For example, airflow can cause a typical phase shift of 180 degrees at a frequency of 200 hertz. Therefore, the present invention uses an adaptive prediction scheme that can track the phase of the control signal as it shifts over time. One such scheme is to narrowly filter the output signal of the transducer at the primary frequency of the control signal, then shift the phase of the predicted control signal to match shifts in the phase of the output signal of the filter.

Convolution may be the best choice for detection mathematically but it may be unnecessarily expensive to implement electrically, particularly for single-frequency control signals. For single frequencies, simple phase-locked loop circuitry will suffice and will automatically adjust for shifts in phase.

The detection processes may be made adaptive by lowering the detection criterion level during periods of high noise and airflow, thereby lowering the possibility of a false stopping of the machinery. The noise and airflow can be conveniently and economically estimated without the need for a separate and problematic airflow sensor by examination of the output signal of the detector transducer. The amount of broad-band noise can be estimated from the amplitude of the output signal, and the signal can be filtered for frequencies characteristic of pseudosound, with the filtered amplitude indicating the airflow. Electrically, this can be realized with common circuitry used for automatic gain control.

The problem with using a continuous signal as the control signal is to provide power for its generation at the work point; batteries may work for a momentary signal, but they are unsuitable for a continuous signal. The solution adopted by the present invention is to use air power from the central vacuum cleaner itself. Very little of the airflow is required.

There are many possibilities for air-driven acoustic generators, including whistles, sirens, and even an electrical speaker powered by an air-driven generator. However, the present invention embraces one type of generator as particularly advantageous in regards to frequency stability, efficiency at low frequencies, reliability, and cost. The best choice for an acoustic generator is a freely vibrating reed, as used in harmonicas, accordions, and reed organs. The reed can be manually plucked as well as powered by airflow, although when powered by unidirectional airflow the signal is in effect rectified so that the primary frequency component of the airflow signal will be twice that of the plucked signal even though the reed itself is vibrating at the same rate. The reed can be manufactured easily, and the frequency components of the generated signal can be changed easily by twisting or bending the tip of the reed, as is done when organ reeds are voiced.

Certain features of the waveform generated by the reed can be easily changed during operation. Such waveform changes can be used for signaling other control functions, such as motor speed control. Changes can be made to the waveform by varying the pressure drop or airflow across the reed, by adjusting a feeler wire that exerts pressure on the throat of the reed, or by altering the airflow pattern around the tip of the reed. This pattern can be altered, for example, by altering the base plate of the reed or by opening another pathway for air to reach the tip of the reed.

In particular, the waveform change associated with a change in air pressure across the reed can be exploited to signal the pressure directly as part of a system to automatically control the pressure at the working point, so no special pressure sensor is needed. The major change in the waveform that occurs with increasing pressure is that air flows through the reed for a longer portion of each cycle of the vibrating reed. Using the reed, a pressure change can typically be signaled to the central machinery within one-tenth of a second, in contrast to the several seconds required for the pressure change itself to reach the central machinery. The faster signaling time is critical if the central machinery is to be used in the regulation of pressure at the working point.

The generator for the acoustic control would most naturally be located in the handle held by the operator, however, it could be placed elsewhere. For example, a reed could be built into each inlet valve so that the inlet could be used as a working point without the hose or wands. Also, the reed could be put inside the end of the hose that is inserted into the inlet valve, yet it could still be controlled from the handle by means of a mechanical linkage or a small-diameter air tube running the length of the hose. With the reed located in this position, the signal generated by the reed would not have to travel through the acoustically muffling hose and could therefore contain higher frequencies or less power.

The housing of the reed must include an air cavity on the supply side of the reed. The cavity acts as an air reservoir or capacitor for the reed so that it can vibrate freely and not be constrained by a pressure drop during each vibration cycle. The reed should be connected to the pipe system by a duct that is horn-shaped for good acoustic coupling and for the protection of the reed from debris.

Optionally, a resonator can be placed in communication with the reed to enhance or absorb particular frequencies. A resonator can stabilize the phase and frequency of the reed. Also, a resonator can restore the fundamental vibration frequency of a reed whose acoustic signal has been rectified by airflow, as is done by the action of the sounding board in a reed organ. Also, a resonator can extend the time that the reed vibrates after being plucked manually. Unfortunately, the handle is too small to conveniently accommodate a quarter-wavelength standpipe resonator suitable for very low frequencies. However, a Helmholtz resonator may be constructed easily by using the normally hollow interior of the handle as the resonator volume, which can be connected to the reed by means of a small-diameter tube whose length and diameter have been chosen to tune the resonator. The resonator can also be filled with foam or equipped with discs in order to lower the resonant frequency.

For less harmonic distortion, the reed should be made as wide as possible with weight concentrated at the tip. The other end of the reed can be narrowed to lower the fundamental frequency. Also, a larger reed should be more durable and easier to pluck. The handle should have enough space for a reed as large as two centimeters wide by ten centimeters long.

The reed can be conveniently controlled by the operator by means of a slide switch on the handle. This switch should be as convenient for the operator to use as the current relay switch. The acoustic switch has the additional advantage that it cannot unintentionally activate the cleaner when the hose is inserted into the inlet valve, as is the case if the current relay switch is left in the ON position. Also, the acoustic control slide switch can easily incorporate the bleed-air control slide, which is not the case with the current relay switch.

The slide switch should have three positions: OFF, ON, and START, with the START position being spring-loaded to return to the ON position. When the switch is moved to the START position, the reed is manually plucked by a finger attached to the switch; when released, the switch slides to the ON position, but the finger is diverted on the return stroke from hitting the reed again. Optionally, the reed can be plucked by the rotation of a star wheel that is pushed when the switch slides to the START position. In either the START or ON position, the switch exposes an orifice that admits air to the air cavity of the reed, so that the reed will continue vibrating after the central machinery has started. When the switch is moved to the OFF position, the orifice is closed, thus removing power from the reed. Although the reed continues to vibrate for a time, its output is no longer rectified so that the fundamental frequency returns immediately and continues until the reed stops vibrating. The shift from rectified to fundamental frequency is more easily detected than is just the cessation of the rectified frequency even if the reed were stopped instantly.

The pathway that connects the orifice at the slide switch to the air cavity of the reed can be designed to regulate the pressure across the reed, which can increase the frequency stability and life of the reed. Pressure can be partially regulated by putting many twists and turns into the pathway or by providing a second air pathway that bypasses the reed.

More than one reed can be controlled by the slide switch. There could be separate start and run reeds, for example, or reeds for other control functions. However, a single reed should be able to handle all control functions together more economically.

Although vibrating reeds can be designed to be quite powerful at very low frequencies, as evidenced by reed organs, there still may be some larger applications where more power is desirable. For such applications, the reed can be replaced with a valvular reed, also called a diaphone, in which a disc or small cylinder is attached to the tip of the reed and is used to open and close an air pathway. A valvular reed can generate much greater acoustic power and yet has the same frequency stability as the vibrating reed.

Also because of the greater power, the valvular reed may be chosen as the acoustic generator for the alert signals issued from near the central machinery by the monitor system. Greater power would be needed by the monitor system, for example, if the alert signal were to be issued during periods of high airflow and if the alert were to be indicated to the operator by the alert signal causing the hose to vibrate.

In the present invention, acoustic signals can also enable the operator to monitor the central machinery. Monitor alerts can be communicated to the operator by transmitting acoustic signals backwards through the pipe system from near the central machinery to the working point. Such monitor alerts could include the need to check an alert panel on the central machinery, to check the dirt filter, or to have the cleaner serviced. In most cases the alert does not have to be issued immediately; it could be postponed for several minutes during periods of high noise or even held until the operator is through vacuuming or until the cleaner is started up again. Before the cleaner is started, the alerting acoustic signal could be a simple tone or a voice message, perhaps synthesized from bass frequencies for better transmission; such an alert could be heard when the operator opens the inlet valve to insert the hose. After start up, the alert signal could be designed to cause vibrational contractions noticeable by the operator in the hose or in a membrane in the handle, for example, or an electrical detector and indicator could be installed in the handle. Alternatively, the alert could be given while slowing or stopping the central machinery for a brief period. Much of the control detector electronics and the detector transducer could be shared to produce the monitor alert signals.

A detector transducer that is also used to generate monitor alert signals must be a bidirectional transducer; it should not be a velocity-type microphone, for example. The present invention embraces one type of transducer as particularly well suited to doing both jobs at low cost. That transducer is a two-centimeter square piezo-electric crystal attached to a metal foil diaphragm and housed in a metal case with a diameter of 5 centimeters. The large size of the transducer allows it to better handle very low frequencies as compared to other widely-available microphones. Also, it will fit in the end of the detector tube without additional provisions, other than a cushioning foam to isolate it from tube-wall vibrations. The metal construction is preferred for the harsh operating environment of the pipe system.

In summary, the invention provides a reliable communication method by which the remotely located operator can control and monitor a central vacuum cleaner. The method is totally acoustic, fail-safe, and bidirectional, and it uses the air in the pipe system of the cleaner as the transmission channel. With the method, reliable communication is possible even during periods of high airflow and noise in the pipe system.

DETAILED DESCRIPTION OF THE PREFERRED EMBODIMENT

As required by the statutes and case law, a detailed embodiment of the present invention is disclosed herein. It is, however, to be understood that the disclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
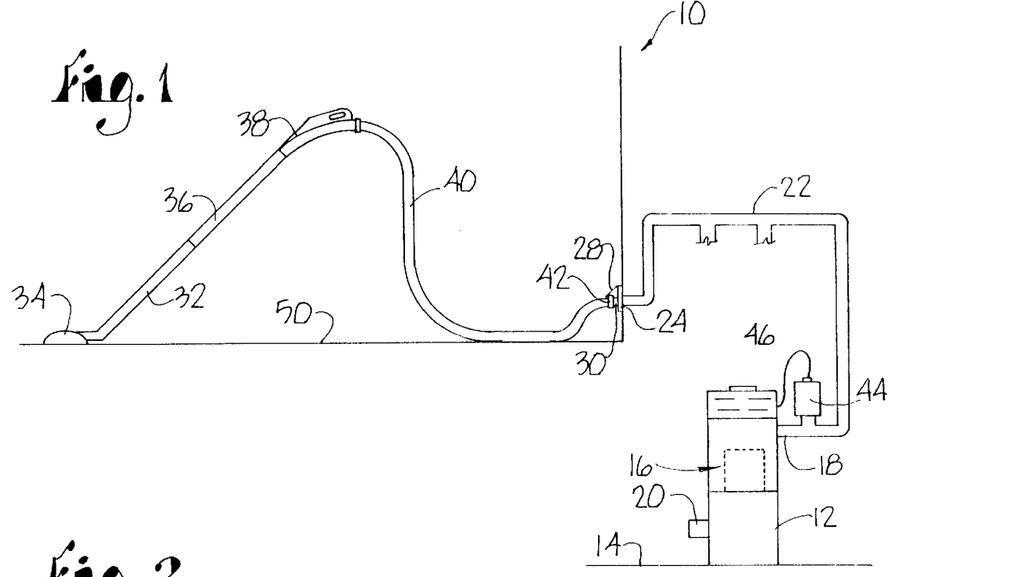
FIG. 1 is a side elevation schematic drawing of a central vacuum system according to the present invention.

Referring to FIG. 1, there is shown a central vacuum cleaner 10 having a housing 12 resting on the floor 14 of a basement. The housing 12 includes a vacuum pump and electric motor assembly 16, an air inlet 18, and an exhaust duct 20. A network of ducts or tubing 22 is connected to the air inlet 18. The tubing 22 is fixed to the inlet valve 24 in the wall 26 of a room where the vacuuming is to be done. The inlet valve 24 includes a flap valve 28 for covering and sealing the vacuum opening 30 when the inlet valve 24 is not in use. A wand set 32 includes a nozzle 34 connected to the wand tube 36, and a handle 38. A hose or flexible tube 40 is connected to the handle 38 and is removably connected to the inlet valve 24 by the coupling 42.

The handle 38 is adapted to transmit sound signals through the hose 40 and the network of tubing 22, and, as will be described in detail below, to the detection tube 44. A shielded wire or lead 46 connects an acoustic transducer 48 (FIG. 2) seated within the detection tube 44 to the electronic circuitry shown in block form in FIG. 2.

When the vacuum pump and electric motor assembly 16 are turned on, air is drawn through the entire system from the nozzle 34 until it is exhausted through the exhaust duct 20, carrying debris picked up from the floor 50 and depositing it in a receptacle, such as a bag (not shown) located inside the housing 12.

Figures 3, 4:
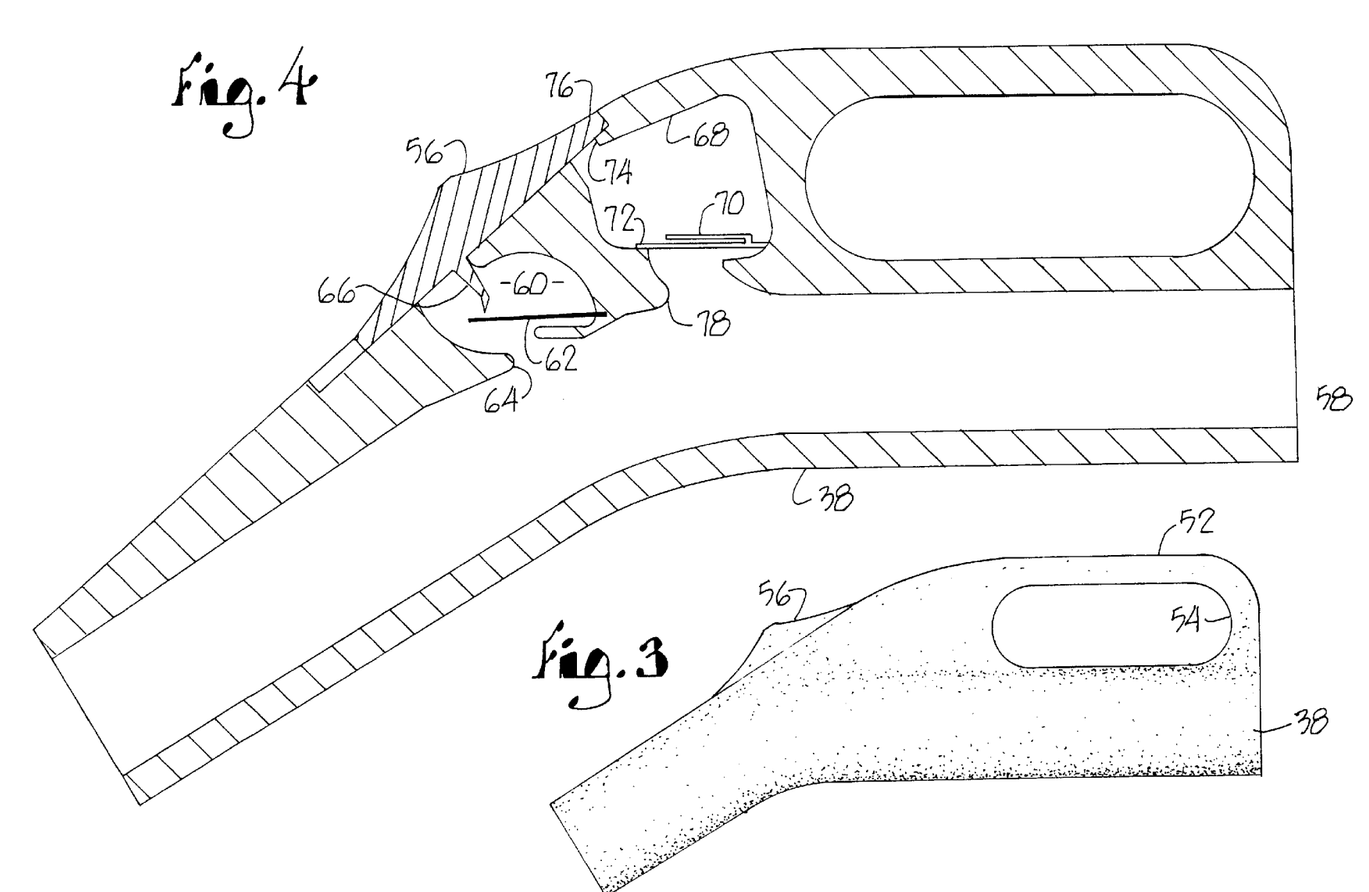
FIG. 3 is a side elevation of the handle shown in FIG. 4.
FIG. 4 is a cross sectional side elevation of the handle assembly.

Referring to FIG. 3, there is shown the handle 38 having a handhold portion 52 including an elongated aperture 54 that the operator can grasp, if desired. The handle 38 includes a moveable switch 56, which is a slide switch.

Referring to FIG. 4 the handle 38 is shown in cross section illustrating the duct 58 that the air is drawn through when the central vacuum cleaner 10 is operating. The handle 38 includes an internal air cavity 60, which houses a start-signal reed 62. The start reed oscillates at a frequency of 240 hz when struck or plucked.

The start reed 62 is plucked by a pick 66 that is an integral portion of the moveable slide switch 56 when the slide switch 56 is moved to the start position, that is, downward as shown in FIG. 4. The sound developed or generated by the start reed 62 in conjunction with the air cavity 60 is transmitted through the horn-shaped duct 64 and all associated tubing of the central vacuum cleaner 10 to the detection tube 44, whose design and function are described below.

The pick 66 is preferably made of a flexible material, such as soft plastic or rubber, so that it will bend when it contacts the reed. The tip of the pick 66 is pointed and is bent in the direction of the tip of the start reed 62. When the slide switch 56 is moved to the start position, the pick 66 will wipe against the start reed 62 and thereby be bent backwards slightly. Consequently, the start reed 62 will be pushed downward further until the pick 66 has been moved forward enough to release the reed. The shape and flexibility of the pick 66 are such that the tip of the pick will spring forward at the movement of release and be out of the path of the start reed 62, thereby giving the required quick release for plucking even though the slide switch 56 may be moving relatively slowly. The tip of the start reed 62 is rounded slightly and bent down; this configuration helps the tip of the pick 66 to bend by riding up and over the reed or by diverting to the side of the reed when the slide switch is returned to the off position. In this embodiment of the invention, the run position of the slide switch is the same as the start position; however, a spring could be added to the front edge of the slide switch to move the switch backwards to a separate on position that would still leave uncovered an orifice 74 of the run cavity 68. The particular material and dimensions of the pick 66 and start reed 62 are selected so as to provide the target frequency of 240 hz when struck or plucked.

Both the start reed 62 and the run reed 70 can be described as a freely vibrating beam clamped at one end and having a rectangular cross-section. Such a beam is known to vibrate at a frequency, f, which is related to the beam length, L, the beam thickness, A, and the speed of sound in the beam material, C, as described by the following formula: $A=6.2 * f * L^2/C$, where the units are consistent. For example, a reed with a frequency of 240 hz could be made from copper having a value of C of 350000 cm/sec and would then be 0.064 cm thick with a length of 4 cm. This reed could be shortened while keeping the same frequency if sufficient weight were added to the tip or if the area near the clamped end (the throat of the reed) were sufficiently thinned, grooved, or drilled. Since the frequency of vibration is not dependent on the width of the reed, the reed can be made as wide as possible, 2 cm for example, to maximize the output power of the reed.

Other frequencies can be added to the waveform of the reed by twisting, rounding, or splitting the tip, as is done in the voicing of reeds in reed organs. The exact frequency of vibration of the reed depends on the size and shape of the cavity in which the reed is mounted. The cavity should be resonant at the desired frequency of vibration for the reed. The run reed is additionally influenced by the base plate 72, which surrounds the reed, and particularly by the width of the gap between the plate and the reed. For maximum power, the gap should be as small as possible without distorting the frequency of vibration of the reed.

Figures 5, 6, 7:
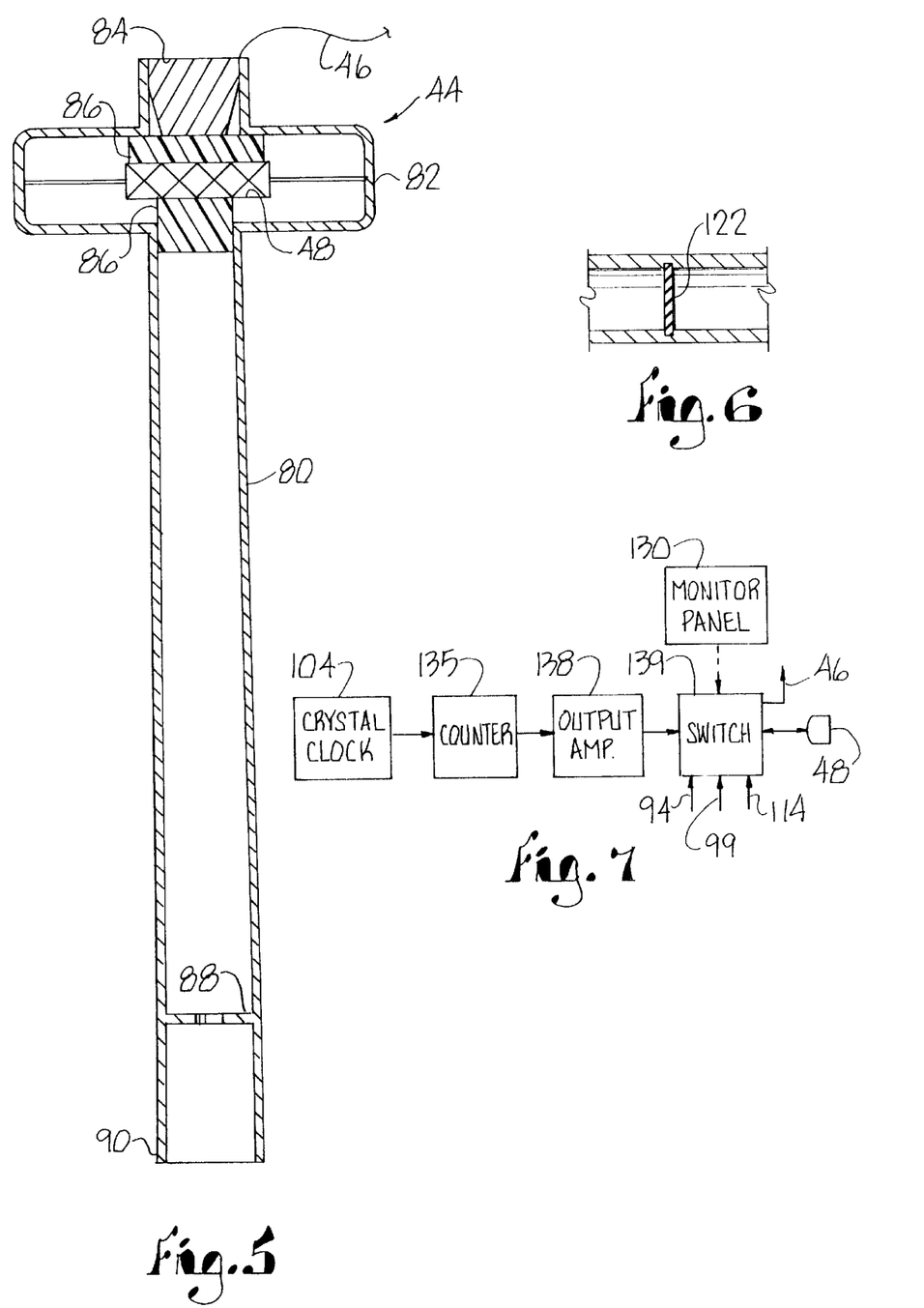
FIG. 5 is a side elevation of the detection tube for receiving the start and run sound signals.
FIG. 6 is a longitudinal sectional view of a bypass tube arrangement.
FIG. 7 is a schematic diagram of a second monitoring circuit used in the present invention.

A reed frequency as high as 240 hz is preferred primarily because of size limitations of currently available hose handles, although this frequency is somewhat easier to detect and process than lower frequencies if standard electronic components are used. However, a lower frequency would be preferred if custom components are used or if more space is available for a bigger reed, or if space is economized by using a single reed for both the start reed 62 and the run reed 70. Frequencies in the neighborhood of 16 hz are preferred because of lower attenuation in the hose and piping system and because of lower background noise at these frequencies, including noise from rubbish; however, mechanical filters, such as that shown in FIG. 5, are harder to construct for these frequencies because of their longer wavelengths.

The second or run cavity 68 is formed within the handle 38. A run reed 70 mounted on a base plate 72 is seated and fixed within the run cavity 68. An orifice 74 is covered by the flap end 76 of the moveable slide switch 56 when the switch 56 is in the off position. When the slide switch 56 is in the start position or the run position, the orifice 74 is uncovered. When the motor 16 is turned on, therefore, air is drawn through the orifice 74, where it causes the run reed 70 to oscillate. The sound waves thus generated are transmitted through the horn-shaped duct 78 into the duct 58 and throughout the tubing 22 and duct work of the system to the detection tube. The run reed vibrates at the rate of 132 hertz, but the air passing through the run cavity 68 rectifies this rate to produce a run signal having a frequency of 263 hz +/-10 hz. The frequency difference between the start signal, about 240 hz, and the run signal, about 263 hz, allows these two signals to be received by the same microphone and analog amplifiers but to be further processed by different electrical circuitry that is only responsive to signals within a narrow range.

In operation, the slide switch 56 is moved downward along the handle 38 to the start position, which causes the pick 66 to pluck the start reed 62, thereby generating a signal of 240 hz. This start sound signal is transmitted through the hose 40 and the network of tubing 22 to the detector tube 44, where an electrical circuit responsive to this signal turns on the vacuum cleaner. The moveable slide switch 56 has been moved to the run position in the process of plucking the start reed 62, thereby uncovering and exposing the orifice 74. When the electric motor 16 comes on, air is drawn through the orifice 74 and the run cavity 68, where it causes the run reed 70 to generate a continuous tone of about 263 hz, which is conducted through the horn-shaped run port 78 into the duct 58 and through the network tubing 22 to the detection tube 44, where the run sound signal is converted to electrical signals that are transmitted to electrical circuitry responsive to the run sound signal thus generated, which maintains the vacuum pump and electric motor assembly 16 in the on state.

Figure 2:
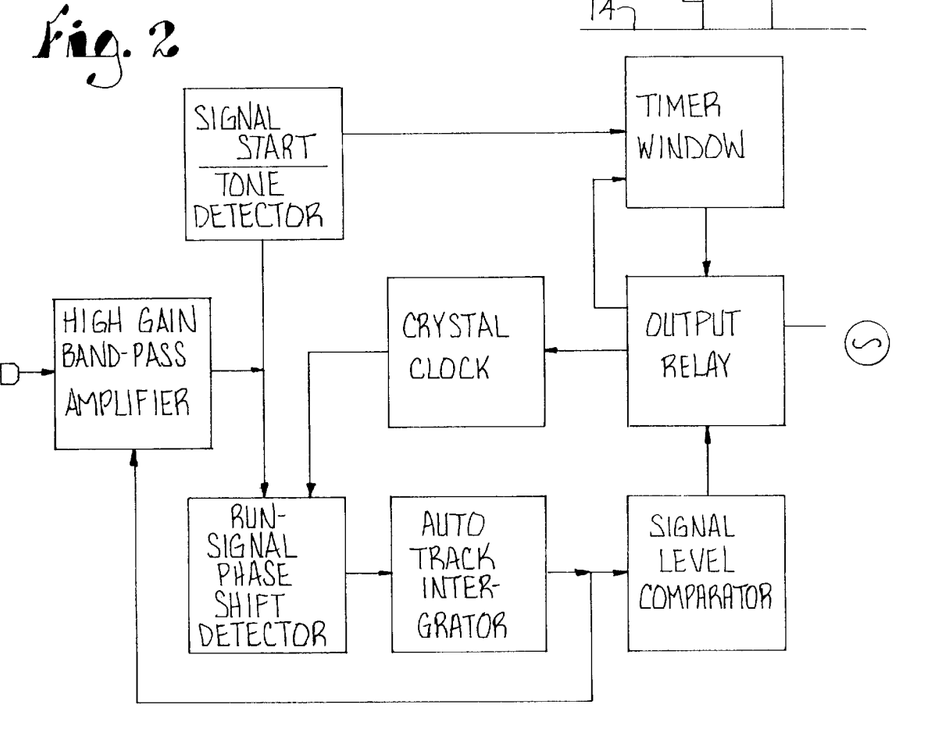
FIG. 2 is a block diagram of the electrical circuitry used for controlling the on and off switching of the central vacuum cleaner.

The transducer or microphone 48 located within the detection tube 44 transduces the sound signals into electrical signals for further processing by the electrical circuitry shown in FIG. 2. When the moveable slide switch 56 is moved upward to the off position, the end flap 76 of the moveable slide switch 56 covers the orifice 74, preventing the run reed 70 from oscillating by blocking the air flow across it. Electrical circuitry responsive to the absence of the sound signal from the run reed turns off the central vacuum cleaner 10.

Naturally, once the central vacuum cleaner 10 is turned on, the tubing network 22 is filled with noise generated by striking objects with the nozzle 34, the air rushing through the tubing 22, noises generated by the vacuum pump and electric motor assembly 16, and so forth. This makes it difficult to detect reliably the sound signals generated by the run reed 70. Much of the detection apparatus of the central vacuum cleaner 10 is directed to selecting or detecting the desired start and run signals from among all the other sounds or noise generated by the central vacuum cleaner 10.

Referring to FIG. 5, the first stage in the detection process occurs in the detection tube 44. The detection tube 44 comprises a standpipe 80 having a diameter of approximately 2 inches (5.08 cm) and a length between 23 and 27 inches (58–69 cm), preferably about 25½ inches (65 cm), and 3 inch segment for fastening into the tubing 22 so that the standpipe is in fluid communication with the duct work and tubing 22. The standpipe 80 is basically a quarter-wave standpipe, although it is not open to the atmosphere at both ends. The optimal dimensions of the standpipe 80 must be empirically determined for each specific application due to the effect of noise, air pressure changes, and so forth that are unique in different applications. A resonate chamber 82 near the top of the standpipe 80 houses the crystal microphone 48, which is a circular microphone approximately 2 inches (5 cm) in diameter having a frequency response range of 50 hz to 8 Khz, a 26 ohm impedance and a −50 dB response within that frequency range. A plug 84 seals the top end of the standpipe 80. Two foam cushions 86 approximately 1 inch thick (2.54 cm) are located within the standpipe 80 adjacent to the microphone 48, with one foam cushion 86 above the microphone 48 and one foam cushion 86 below it. The microphone shielded wire or lead 46 passes between the plug 84 and the standpipe 80 to carry the electrical signals generated by the microphone in response to the appropriate sound signals to the electrical circuitry illustrated in FIG. 2.

The detection tube 44 further comprises a filtering disk 88 sealed within the standpipe approximately 3 inches (7.62 cm) from the bottom end 90 and including a centrally located aperture ¾ inch (1.9 cm) in diameter. As described, the detection tube 44 mechanically filters the noise that is conducted throughout the central vacuum cleaner 10, screening out many of the unwanted frequencies and at the same time mechanically amplifying the desired frequencies, centered on about 263 hz. It has been found that triggering or signaling frequencies below 600 hz are best because less of the noise generated by the central vacuum system 10 during operation falls below 600 hz than above it. Both the start signal from the start reed 62 and the run signal from the run reed 70 are received by the microphone 48 within the detection tube 44 and are conducted to the electrical circuitry shown in FIG. 2 by the shielded cable 46. They are, however, processed differently by the electronic circuits, which will be discussed next.

Referring to FIG. 2, the signal of about 240 hz +/−10 hz from the start reed 62 is converted to an analog electrical signal by the microphone 48 and conducted to the high gain band-pass amplifier 92. The amplifier 92 amplifies the start signal by a factor of approximately 9,000. Then the signal is sent to a band-pass filter within the module 92. The filter has a low Q of approximately 15 and a gain of 10. The filter clock is set at 23.5 Khz, for maximum run reed 70 signal gain at a frequency of 263 hz. The filter is primarily responsible for cleaning up the start signal and integrating it over time so that the start signal lasts approximately 325 ms. The signal is transmitted on lead 93 to the start-signal tone detector 94, which includes a microprocessor and associated circuitry. The center frequency of the tone detector 94 is set at 240 hz, the signal of the start reed 62. The output of the start-signal tone detector 94 is either high (1) or low (0). When a valid start signal is detected, the output of the start-signal tone detector 94 goes low for the 325 ms duration of the integrated start signal.

The output signal of the start-signal tone detector 94 on the lead 98 drives the timer window 96. The timer window circuit 96 develops three time windows, the early window consisting of 275 ms from the time a signal is received on lead 98, a late window of 375 ms that begins at the end of the early window, and an enable window, which is a 100 ms overlap of the early window and late window. If the output to the timer window 96 on the lead 98 goes high or stays high during the early window, thereby indicating no valid start signal, the timer window 96 is set in the "noise detected" state and the start timer and the start enable functions are reset and locked out. The window timer circuit 96 provides a discrimination function that prevents the vacuum cleaner motor from starting until a proper start signal is received. For example, if an extraneous signal is received and happens to be of the correct frequency, but is too short in duration, it is received in the early window, and if too long, in the late window. In either case the vacuum motor will not start. Thus, the timer window prevents the motor 16 from starting until the tone detector receives a start signal of the proper duration and frequency.

The tone detector 94 output on the lead 98 goes low for the 325 ms duration of the signal from the start reed 62 when it recognizes a valid start signal, and the start function of the timer window 96 is enabled for the entire duration of the enable window. When the start signal from the start reed 62 ends, the tone-detection signal on the lead 98 goes from low to high and the motor 16 is started in response thereto. If the signal on the tone-detection lead 98 remains low, indicating the presence of a valid start tone signal during the entire early window, the start function is enabled for the duration of the 100 ms enable window. If the tone detection lead 98 goes from low to high during the enable window, i.e., 275 to 375 ms after the tone detection lead 98 first goes low in response to receiving a valid start signal, then the central vacuum cleaner 10 is started. The output relay 101 is locked on, starting the vacuum pump and electric motor assembly 16. The timer window 96 keeps the motor runing for approximately 3 seconds. If no further signals are received, the motor stops running.

The run reed 70 must generate a run sound signal in order to keep the motor 16 running. When the start-signal tone detector 94 output on the lead 98 goes from low to high after the enable window ends, the timer window 96 is reset in preparation for the next start tone signal. The run-signal circuitry is now enabled.

With the vacuum pump and electric motor assembly 16 now turned on and running, the central vacuum cleaner 10 begins pulling air through the nozzle 34, the wand 32, the hose 40 and the rigid tubing 22. The orifice 74 in the handle 38 is already uncovered because the moveable slide switch 56 has been moved to the run position. The orifice 74 allows air to enter the run reed 70, generating a 263 hz signal, which is carried along with the airborne particulate materials down the tubing 22 to the housing 12.

The signal and noise arrive at the detection tube 44 where all frequencies that are not near 263 hz are attenuated by 12 dB or more by the mechanical filtering of the standpipe resonator 80, as described above. The microphone 48 picks up the resulting signals and sends them via the shielded cable 46 to the high gain band-pass amplifier 92. This signal is sent through a band-pass filter set to 263 hz, which removes all other frequencies. The band-pass filter is a MF10 band-pass filter, which superimposes a step function on the signal, resulting in a 263 hz signal wave which is sent to a buffer/driver and then into the run-signal phase-shift detector 100. The phase shift detector consists of a microprocessor, such as Motorola MC 1496 (not shown) and associated hardware consisting of resistors, capacitors, and a few solid state logic devices.

The frequency and phase of the output of the run reed 70 may drift over time as the operating conditions change. For example, changes in airflow may change the frequency output from the run reed 70 while it is oscillating. The frequency output from the run reed 70 may change from perhaps about 253 hz to 273 hz slowly and probably through a slight phase shift in each additional cycle as the pitch changes from one frequency to another. The run signal phase shift detector 100 tracks this low rate of frequency shift and locks onto that signal when the frequency shift is occurring at a rate of a fraction of a cycle per second. This capability allows the phase-shift detector 100 to operate through a very narrow window of positive or negative portions of a cycle for each phase shift, but will still be able to track the signal even though it may drift anywhere within +/−5 hz to 10 hz window allowed. Thus, the run signal phase shift detector 100 will detect and tract, thereby reporting as valid, a run signal from the run reed 70 that moves within a range of about 250 hz to about 275 hz.

The analog signal from the amplifier 92 to phase-shift detector 100 along the lead 102 is converted to a digital signal by the microprocessor, which does the sampling to detect any phase shift that may occur. After the microprocessor has locked onto the signal and processed it, it produces a synthetic analog signal based on the analog signal that entered the phase-shift detector 100 on the lead 102. The digital circuitry on the phase-shift detector 100 is clocked by the crystal clock 104, whose output signal is conducted on leads 93, 94 and 95.

The microprocessor, phase detector, modulator, and demodulator, of the phase shift detector 100 samples the amplitude of the incoming signal at a rate of 283 or 244 hz. This sample rate must be stable and is controlled by the crystal clock 104. The output of the phase-shift detector 100 on the lead 106 is a synthesized analog signal comprising a combination of the input signal and the clock signal. This output on lead 106 contains the phase data in analog form. It is then filtered by a low-pass filter and its output is approximately 20 hz.

The signal on lead 106 is transmitted to the auto track/integrator 108. There, the signal is input to a low QMF10 band-pass and a high 10 band-pass. The low Q 10 band-pass drives a frequency multiplier that multiples the frequency by 100 times and locks on and tracks the phase-shift signal. The low Q band-pass filter controls the high Q band-pass filter so that the high Q filter is locked onto the run signal. If the run reed 70 changes frequency, the efficiency of the system is maintained by selecting a clock speed to drive the high Q MF10 filter for maximum band-pass amplitude. The auto tract/integrator 108 will lock onto and track a signal in the range of about +/−5 hz from the center frequency of 263 hz. The output of the high Q 20 hz band-pass filter in the auto track/integrator 108 is the phase shift data integrated over a long time, that is, in blocks of approximately 2 seconds each. The amplitude of the analog output signal from the auto track/integrator 108 on the lead 110 is directly proportional to the degree of phase difference of the signal entering the auto track/integrator 108 on the lead 106 and the reference signal, which is generated by the crystal clock 104. This phase-shift signal is compared to a minimum level of 1.8 volts and if the phase-shift signal average is less than 1.8 volts, it indicates that the sound signal expected from the run reed 70 is absent or weak, and the vacuum motor 16 is turned off. So long as the signal maintains an average amplitude greater than about 1.8 volts, the vacuum motor 16 remains in the on state.

This signal comparison is undertaken in the signal level comparator 112, whose output is transmitted on the lead 114 to the output relay 100. The output from the output relay 100 is conducted on the lead set 116 to the electric motor 16.

An automatic gain control feedback loop partially controls the gain of amplifier 92 based on the output signal level on lead 110, which is fed back to the amplifier on lead 120. In effect, this feedback adapts the amplifier to changing noise and signal levels based on their immediate prior histories.

As described, the circuit illustrated in FIG. 2 comprises an adaptive circuit. The circuit can adapt for run reed 70 signal frequency and phase changes, signal level changes or noise amplitude changes, and adjust by adapting circuit parameters for maximum signal processing efficiency. This is equivalent to changing criteria for detection. As the central vacuum cleaner comes up to full speed, the run reed 70 signal is very much louder than the background noise, by up to about 60 percent. This characteristic helps the system lock onto the run signal and start the motor 16. Because of the relatively long period of signal integration in the auto track/integrator 108, however, the motor 16 will continue running even if the orifice 74 is blocked for a few seconds after the motor 118 has started. When the blockage is removed, the circuit shown in FIG. 2 will still lock onto and track the run signal from the run reed 70 without interrupting the operation of the central vacuum cleaner 10.

Another adaptive correction can be made for background noise. Noise caused by pseudosound, which is not acoustic but is generated by the pressure variations of turbulent airflow, can be predicted if the speed of the airflow is known. The level of noise predicted for the frequency band of the run signal can then be used as a basis for modifying either the detection level criteria used by the signal level comparator 112 or the gain of the input amplifier 92. This adaptive correction is particularly useful because it is based on current conditions rather than prior signal histories. However, regular air speed sensors tend to be too expensive and too easily damaged by dust for use in central vacuum tubing; consequently, a method has been developed using microphones to estimate the speed of the air flow.

Figure 8:
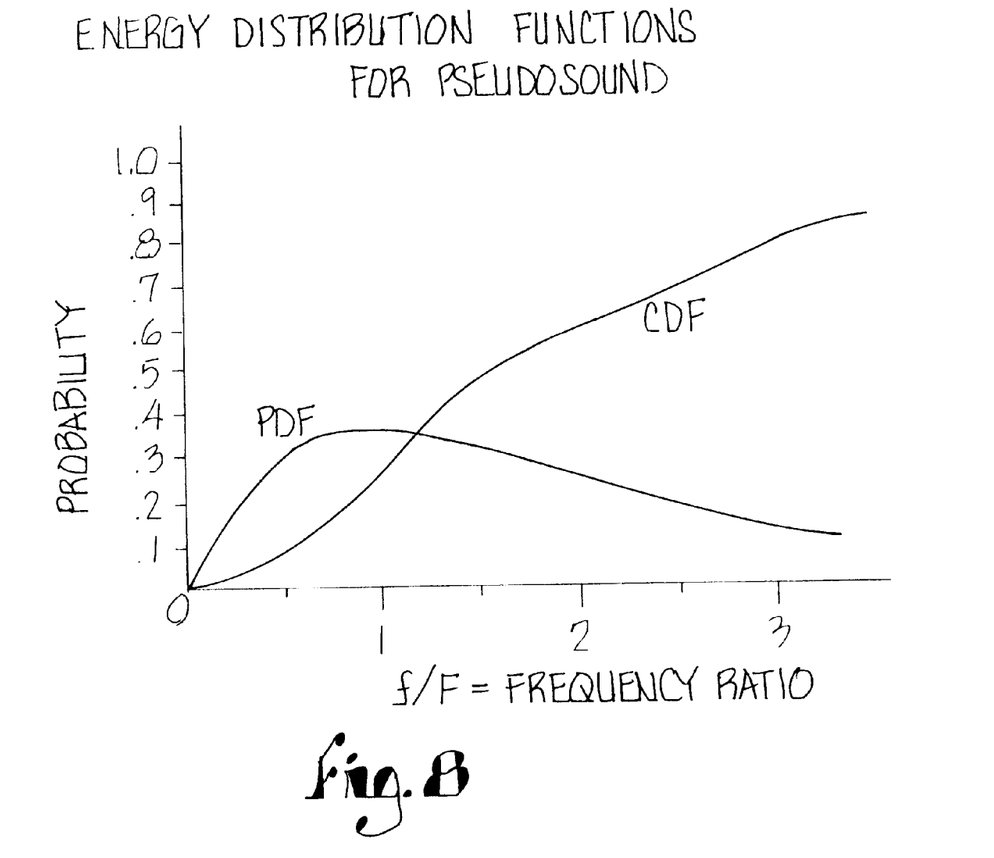
FIG. 8 is a graph of energy distribution functions for pseudosound.

The speed of the airflow can be estimated by using two microphones and correlating their outputs as previously described, assuming that the airflow is 20 meters per second or less. Once the airflow speed, v, is known, the probability distribution function (PDF) or the cumulative distribution function (CDF) given in FIG. 8 can be used to predict the noise energy at frequency f, the frequency of the run signal. In FIG. 8, F is the frequency of maximum noise energy, which is related to the average air speed in regular vacuum tubing by the following formula: F=0.5 v/d, where d is the diameter of the tubing in consistent units.

Alternatively, the speed of airflow can be estimated by using only one microphone together with a simple spectrum analyzer; this can be more economical because most of the required equipment, including the microphone and microprocessor which can be used to analyze the spectrum, is already available in the circuitry represented in FIG. 2. With one microphone, the received frequency spectrum is analyzed to identify the most energetic frequency, F. The air speed can be determined from the above formula, but this is not necessary for the present purpose because the noise energy at the run signal frequency can be predicted directly using FIG. 8. Predicting the energy is better than assuming that the energy will remain the same as just received by the microphone because of the random nature of the noise and because the feedback loop requires a relatively steady feedback signal in order to maintain stability.

In the preferred embodiment disclosed herein, two sound signals are employed for controlling the on and off switching of the central vacuum cleaner 10. The start reed 62 is plucked by the pick 66 to transmit the initial start signal to turn the unit on. A separate run reed 70 in a separate cavity 68 is employed to keep the unit running once it has been started. The two sound signals have slightly different frequencies, which allows them to be converted to electrical signals by a single microphone or other transducer and amplified in one initial amplifier 92, but to be processed by different electrical circuits thereafter to produce two different results—ie., (1) starting the motor; and (2) keeping it running.

In an alternative embodiment, a single reed may be employed both to provide a start sound signal and a continuous run signal by using a reed that can be plucked and can also be stimulated by air flowing over it from an orifice leading to the resonate cavity in which the reed is seated. In such an alternative embodiment, the circuitry for the start signal tone detector is integrated with the run signal circuitry, which is responsive to a start signal and a run signal.

The teachings disclosed herein may also be used to control functions in addition to the on-and-off switching of the central vacuum cleaner 10. For example, acoustic signals developed by reeds can be used to run the motor 16 at different speeds, such as a low speed and high speed, to make the central vacuum cleaner 10 more responsive to the demands of different types of cleaning. For example, the moveable switch 56 can be equipped with picks adapted to pluck the start reed 62 once to start with the central vacuum system 10, as described above, and a second time, while the motor 16 is running, to change the speed of the motor 16. Moving the slide switch 56 from a low speed to a high speed position would accomplish this result and moving the moveable slide switch 56 from high to low would again pluck the start reed 62, causing the motor 16 to slow down to the low speed. The functions of turning the motor 16 on, keeping it running and turning it off would remain as disclosed herein. When the single reed 62 is used for the function of changing the motor speed, the electrical circuit is adapted to process signals from the start reed 62 differently, depending upon whether the motor 16 is running when the signal is received. Alternatively, a third reed may be employed at a different frequency than the start reed 62 or the run reed 70 to provide a distinctive sound or acoustic signal for changing the motor speed, while may be processed by additional electrical circuitry.

Even very low frequency signals can be blocked by certain components of central vacuum cleaners, including gate valves and interceptor canisters. The present invention proposes to bypass these components with tubing, FIG. 6, that contains a flexible diaphragm 122 which blocks air flow, but transmits very low frequency. The diaphragm 122 can also be built directly into the component.

In review and summary, for starting and stopping the central machinery of the cleaner 10, the operator moves a slide switch 56 that plucks a vibrating reed 62 and opens a pathway for air to be drawn through the reed 62. The acoustic signal generated by the plucked reed is transmitted through the pipe system or duct 58 of the cleaner 10 to a detector tube 44 located near the central machinery. Upon detection of the signal, the central machinery is activated; consequently, air is drawn through the reed 70, which thereby generates a continuous signal. To stop the machinery, the operator slides the switch 56 backwards, which closes the air pathway so that the reed 70 stops generating the acoustic signal. When the signal is no longer detected, the central machinery is stopped.

To signal other control functions, such as motor speed control, the operator can move the slide switch 56 to another position, which will change the waveform of the acoustic control signal. Alternatively, motor speed can be regulated automatically to maintain a constant pressure at the working point; for this purpose, a special pressure sensor is not necessary because the waveform of acoustic control signal will directly reflect pressure changes.

For monitoring, the economically preferred embodiment, FIG. 7, of the invention provides only a single alert signal for the operator. The operator than goes to the central machinery and checks a monitoring panel 130 that indicates the exact condition of the central machinery that needs attention. The alert signal is heard directly by the operator when the operator holds the inlet valve open while connecting or disconnecting the hose; the signal is not transmitted while the control machinery is running, specifically while the control signal on either lead 99 or lead 114 is high.

Also, the alert signal is transmitted only if no possible start signal has been detected, specifically, only during the period that the signal on lead 99 is held high for at least 100 ms, indicating that the start-signal tone detector 94 is not receiving any signal that could possibly be the start signal. The alert signal consists of a 100-millisecond beep repeated once every second with a frequency of 600 hertz. Several components of the control circuitry are shared to produce the alert signal. The output of the crystal clock 104 is input to a counter 135 to produce a square wave of desired frequency, which is input to an output amplifier 138 used to drive the bidirectional detection transducer 48. After each beep, the transducer is switched back by switch 139 to the start detection circuitry so that a start signal can be detected.

The invention achieves acoustic communication even during periods of high airflow in the pipe system by using the following:

1) A continuous periodic signal is used which permits detection by convolution and also permits the use of a fail-safe detection logic.

2) The resonant structure, termed a detector tube 44, is used to isolate the acoustic transducer 48 from turbulence in the pipe system and to physically filter out some of the noise before it reaches the transducer.

3) An adaptive circuit is used that tracks phase and that is able to change detection criteria based on changes in airflow and noise.

Also, the invention uses a high-power vibrating reed 62 as a signal source controlled by a convenient slide switch 56 located on the handle 38 of the cleaner 10.

While certain forms of this invention have been illustrated and described herein, the invention is not limited thereto, except and insofar as such limitations are included in the following claims.

I claim:

1. A method for controlling a central vacuum cleaner comprising a central machinery and a pipe system connecting said machinery to a remote working point, in which method the said machinery is activated when a particular acoustic signal is transmitted from the working point to the central machinery through the pipe system even when air is flowing through the pipe system, the method comprising the steps of:

a) generating a continuous acoustic signal during such time as continuous operation of the central machinery of said central vacuum cleaner is desired;

b) transmitting said signal from the working point through the pipe system to the central machinery;

c) detecting said signal near the central machinery; and d) operating the central machinery when said signal is detected, with operation ceasing when detection of said signal ceases.

2. The method set forth in claim 1 including modifying the operation of the central machinery in response to a modification of the waveform of the acoustic signal, with such modified operation including changing the output power of the central machinery.

3. The method set forth in claim 2 wherein the operation of the central machinery is modified as necessary in order to regulate conditions, including airflow and vacuum pressure, at a working point, with such method comprising the steps of:

a) sensing a condition that is being regulated at the working point;

b) modifying the waveform of the acoustic signal in response to changes in said condition;

c) detecting the modification of the waveform near the central machinery; and d) modifying the operation of the central machinery as necessary to regulate said condition at the working point.

4. The method set forth in claim 1 wherein the step of generating the acoustic signal comprises the following steps:

a) generating a complex waveform that simultaneously contains at least two frequency components;

b) generating the waveform continuously; and c) using as a power source for generating the acoustic signal the pressure difference between air inside and air outside the pipe system.

5. The method set forth in claim 1 wherein the step of generating the acoustic signal comprises the following steps:

a) generating a complex waveform that simultaneously contains at least two frequency components;

b) continuously repeating the waveform at intervals of no longer than a few seconds; and c) using as a power source for generating the acoustic signal the moving air inside the pipe system.

6. The method set forth in claim 1 wherein the step of generating the acoustic signal comprises the following steps:

a) generating a complex waveform that simultaneously contains at least two frequency components;

b) generating the waveform continuously; and c) using as a power source for generating the acoustic signal the moving air inside the pipe system.

7. A method of control according to claim 1 wherein the step of transmitting the acoustic signal through the pipe system includes employing a resonant cavity.

8. A method of control according to claim 1 wherein the step of detecting the acoustic signal comprises the following steps for discriminating in favor of the acoustic signal:

a) sampling the acoustic energy present in the pipe system at two points separated by a distance, D, along the length of the pipe system near the central machinery;

b) delaying the signal sampled from the point farther from the central machinery by a time, T, equal to D divided by the speed of the sound moving in the pipe system toward the central machinery; and c) adding the delayed signal to the actual signal sampled from the closer point.

9. A method of control according to claim 1 wherein the step of detecting involves mechanical processing of the acoustic signal before it reaches the detector transducer and comprises one of the following steps:

a) isolating the detection transducer from airflow in the pipe system by placing the transducer in a structure that is attached to the pipe system;

b) filtering the acoustic signal in a resonant structure attached to the pipe system that acts as a band-pass filter for frequencies being detected; and c) delaying part of the acoustic signal by requiring it to follow a longer path to the detection transducer.

10. A method of control according to claim 1 wherein the step of detecting involves convolving the acoustic signal and comprises the following steps:

a) determining the phase and period of the waveform of the acoustic control signal initially transmitted from the working point;

b) summing the acoustic signal sampled from the pipe system by convolving said signal based on the phase and period of the acoustic control signal;

c) subtracting from the convolved summation, the convolved summation of signals received more than a fixed time ago, where that time would normally be less than two seconds; and d) adjusting the phase and period of the convolving process based on the convolved average waveform for the acoustic control signal.

11. A method of control according to claim 1 wherein the step of detecting the acoustic signal is adaptive based on changes to the air inside the pipe system and comprises the following steps:

a) sensing at least one of the following characteristics of the air inside the pipe system, such characteristics including pressure, airflow, and noise level; and b) adjusting parameters of the detection process based on changes in said sensed characteristics, such parameters including the criterion for declaring detection based on acoustic signal strength and the frequency components of the waveform of the acoustic signal that are selected for processing.

12. A method for monitoring a central vacuum cleaner comprising a central machinery and a pipe system connecting said machinery to a remote working point, in which method information about the said machinery, including the need for checking the dust filter, is transmitted acoustically from the central machinery through the pipe system to a working point, with such method comprising the steps of:

a) sensing the existence of a particular condition of the central machinery of said central vacuum cleaner;

b) generating a particular acoustic signal in response to the sensing of the existence of said condition;

c) transmitting said acoustic signal through the pipe system to a remote working point; and d) communicating the acoustic signal to the operator of the vacuum cleaner.

13. A method of sensing airflow in a central vacuum cleaner comprising central machinery and a pipe system connecting said machinery to a remote working point, which method comprises the following steps:

a) detecting pressure variations in the air inside the pipe system of said central vacuum cleaner with a pressure-sensitive microphone;

b) filtering the signal of the microphone for frequencies characteristic of pressure variations associated with turbulent flow; and c) estimating the speed of the airflow based on the magnitude of the filtered signal.

* * * * *